United States Patent
Bungo (10) Patent No.: US 9,410,487 B2
(45) Date of Patent: Aug. 9, 2016

(54) CONTROL APPARATUS FOR GENERAL PURPOSE MACHINE

(71) Applicant: HONDA MOTOR CO., LTD., Tokyo (JP)

(72) Inventor: Keiichiro Bungo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 114 days.

(21) Appl. No.: 14/570,643

(22) Filed: Dec. 15, 2014

(65) Prior Publication Data

US 2015/0176504 A1    Jun. 25, 2015

(30) Foreign Application Priority Data

Dec. 19, 2013 (JP) ................. 2013-262270

(51) Int. Cl.
*F02M 1/12* (2006.01)
*F02D 9/02* (2006.01)
*F02M 31/02* (2006.01)
*F02D 41/22* (2006.01)
*F02D 41/20* (2006.01)

(52) U.S. Cl.
CPC ............. *F02D 9/02* (2013.01); *F02D 41/221* (2013.01); *F02M 1/12* (2013.01); *F02M 31/02* (2013.01); *F02D 2041/2089* (2013.01); *F02D 2041/228* (2013.01); *F02D 2200/604* (2013.01); *Y02T 10/40* (2013.01)

(58) Field of Classification Search
CPC ....... F02D 9/02; F02D 41/221; F02D 41/067; F02D 2041/2089; F02D 2041/228; F02D 2009/0205; F02D 2200/604; F02M 1/10; F02M 1/12; F02M 31/02
USPC ................ 123/400; 261/64.6, 39.4, 39.6
See application file for complete search history.

(56) References Cited

U.S. PATENT DOCUMENTS 3,931,797 A * 1/1976 Yoshida ............. F02M 1/12
                                          123/198 D
4,344,898 A * 8/1982 Takada ............... F02M 1/12
                                          261/39.6

FOREIGN PATENT DOCUMENTS

JP          5058058        10/2012

* cited by examiner

*Primary Examiner* — Hai Huynh
(74) *Attorney, Agent, or Firm* — Rankin, Hill & Clark LLP (57) ABSTRACT

In an apparatus for controlling a general purpose engine having a choke valve, a choke valve opening/closing mechanism, a choke valve opening regulating mechanism, a heater and a heater connection terminal, it is configured to detect temperature of the general purpose engine, to determine whether the heater is connected to the heater connection terminal, and to control operation of the choke valve opening/closing mechanism based on the detected temperature to open/close the choke valve when it is determined that the heater is connected to the heater connection terminal, while informing a user to manually open/close the choke valve by a manual opening/closing mechanism when it is determined that the heater is not connected to the heater connection terminal.

10 Claims, 8 Drawing Sheets

CONTROL APPARATUS FOR GENERAL PURPOSE MACHINE

BACKGROUND

1. Technical Field

This invention relates to a control apparatus for general purpose engine, more specifically to a control apparatus for general purpose engine having a choke valve opening/closing mechanism for opening/closing a choke valve.

2. Background Art

There have been proposed, for example, by Japanese Patent No. 5058058, a general purpose engine having a choke valve opening/closing mechanism for opening/closing a choke valve, and a choke valve opening regulating mechanism for automatically regulating opening of the choke valve opened/closed by the choke valve opening/closing mechanism based on the ambient temperature, which makes air/fuel ratio rich by controlling opening/closing of the choke valve (automatic choking function) at engine starting to improve startability of the engine.

By the way, the general purpose engine is sometimes used as a power source of a snow blower, etc., under cryogenic conditions, for example, under −10 degrees Celsius. Usage under such a cryogenic condition may cause malfunction of sensors, electronic components, or various mechanisms installed near the choke valve, and the above mentioned automatic choking function may fail to function properly. Therefore, many users often working under such a cryogenic condition require a general purpose engine having a manual choking function, not automatic choking function that can be manually manipulated to open/close the choke valve by a manual opening/closing mechanism (e.g., a choke lever).

However, since a program stored in an ECU (Electronic Control Unit) differs between a general purpose engine having the automatic choking function and a general purpose engine having the manual choking function, when bringing both the general purpose engine having the automatic choking function and the general purpose engine having the manual choking function to market, it becomes necessary to prepare different ECUs according to the types of the general purpose engines.

SUMMARY

When many different ECUs are required according to the types of the general purpose engines, more manufacturing facilities are required and product management becomes complicated to increase the possibility of wrong assembly in the after market.

Therefore, an object of this invention is to overcome the foregoing problems by providing a control apparatus for general purpose engine that can be coped with a single type of ECU regardless of whether the general purpose engine has the manual choking function.

In order to achieve the object, this invention provides in its first aspect an apparatus for controlling a general purpose engine (engine 10) having a choke valve (74) disposed at an intake air passage (62), a choke valve opening/closing mechanism (100) that opens/closes the choke valve (74), a choke valve opening regulating mechanism (116) having regulating member (thermo wax) that regulates opening of the choke valve (74) opened/closed by the choke valve opening/closing mechanism (100) and a heater (116*g*) that can heat the regulating member, and a heater connection terminal (142) that connects the heater (116*g*) to a power circuit (132), comprising: a temperature detector (temperature sensor 120) that detects temperature of the general purpose engine (10); a heater connection determiner (CPU 136, heater detecting circuit 150) that determines whether the heater (116*g*) is connected to the heater connection terminal (142); and a choke controller (CPU 136) that controls operation of the choke valve opening/closing mechanism (100) based on the detected temperature to open/close the choke valve (74) when it is determined that the heater (116*g*) is connected to the heater connection terminal (142), while informing a user to manually open/close the choke valve (74) by a manual opening/closing mechanism (75) when it is determined that the heater (116*g*) is not connected to the heater connection terminal (142).

In order to achieve the object, this invention provides in its second aspect a method for controlling a general purpose engine (engine 10) having a choke valve (74) disposed at an intake air passage (62), a choke valve opening/closing mechanism (100) that opens/closes the choke valve (74), a choke valve opening regulating mechanism (116) having regulating member (thermo wax) that regulates opening of the choke valve (74) opened/closed by the choke valve opening/closing mechanism (100) and a heater (116*g*) that can heat the regulating member, and a heater connection terminal (142) that connects the heater (116*g*) to a power circuit (132), comprising the steps of: detecting temperature of the general purpose engine (10);

determining whether the heater (116*g*) is connected to the heater connection terminal (142) (S14); and controlling operation of the choke valve opening/closing mechanism (100) based on the detected temperature to open/close the choke valve (74) when it is determined that the heater (116*g*) is connected to the heater connection terminal (142), while informing a user to manually open/close the choke valve (74) by a manual opening/closing mechanism (75) when it is determined that the heater (116*g*) is not connected to the heater connection terminal (142) (S20, S22).

BRIEF DESCRIPTION OF DRAWINGS

The above and other objects and advantages of an embodiment of this invention will be more apparent from the following description and drawings in which.

DESCRIPTION OF EMBODIMENT

An embodiment for implementing a control apparatus for general purpose engine according to this invention will be explained with reference to the attached drawings in the following.

Figure 1:
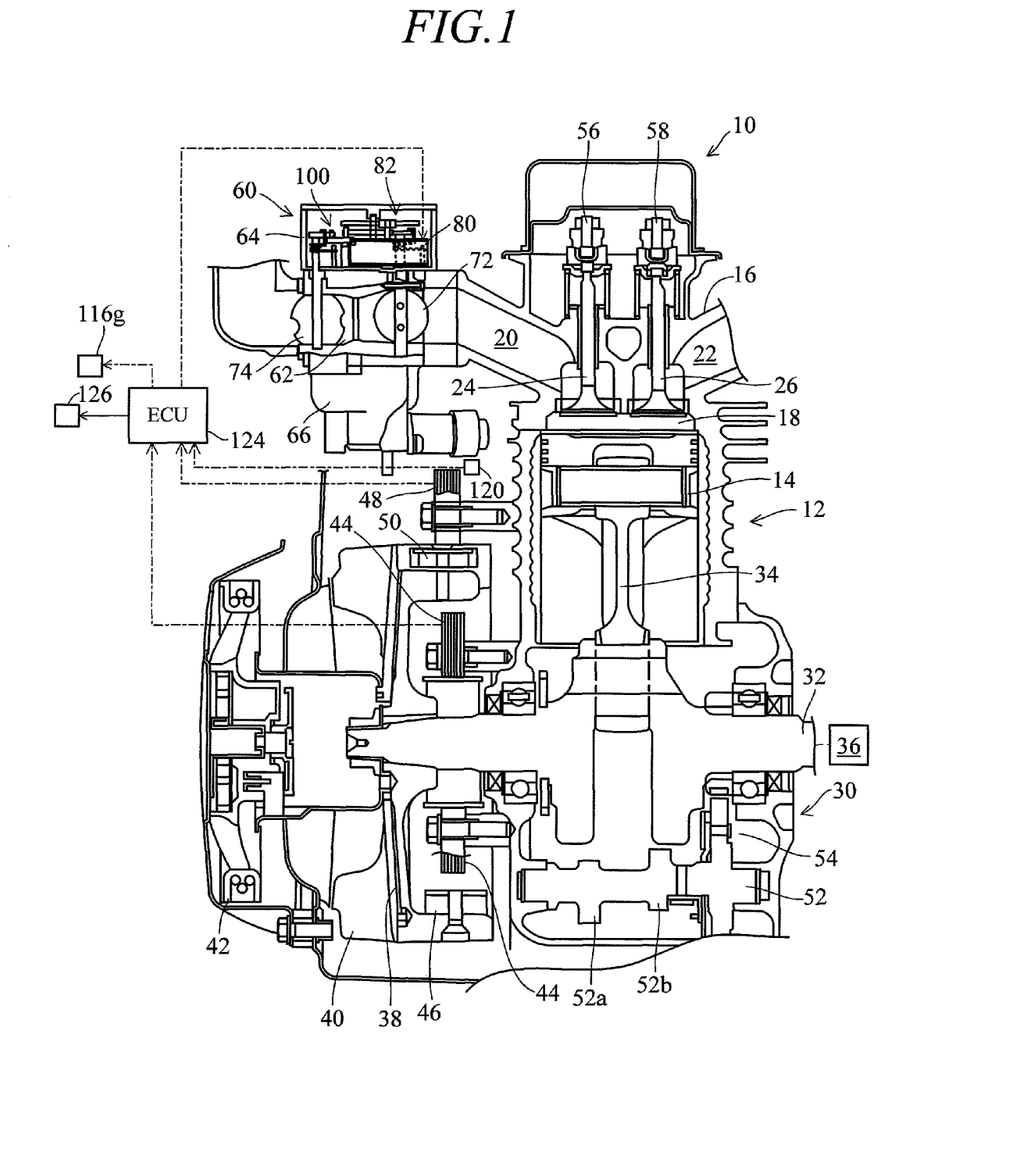
FIG. 1 is a schematic diagram showing an overall view of a control apparatus for general purpose engine according to an embodiment of this invention.

FIG. 1 is a schematic diagram showing an overall view of a control apparatus for general purpose engine according to an embodiment of this invention.

In FIG. 1, symbol 10 indicates a general purpose engine (general purpose internal combustion engine; hereinafter simply referred to as "engine"). The engine 10 is a single-cylinder, four-cycle, air-cooled, OHV engine that runs on the gasoline and has a displacement of, for example 440 cc. The engine 10 is usable in a cold or cryogenic land as a prime mover.

A piston 14 is reciprocatingly accommodated in a cylinder formed inside a cylinder block 12 of the engine 10. A cylinder head 16 is installed on the upper part of the cylinder block 12, and a combustion chamber 18 is formed therein at a position facing top of the piston 14. An intake port 20 and an exhaust port 22 are disposed to be communicated to the combustion chamber 18. An intake valve 24 is installed near the intake port 20, and an exhaust valve 26 is installed near the exhaust port 22. A crankcase 30 is installed on the lower part of the cylinder block 12, and a crankshaft 32 is rotatably accommodated therein. The crankshaft 32 is connected to the piston 14 through a connecting rod 34. A load (for example, work machine such as a snow blower) 36 is connected to one end of the crankshaft 32, and the engine 10 outputs power to the load 36.

A flywheel 38, a cooling fan 40 and a recoil starter 42 for engine starting are installed on the other end of the crankshaft 32. On the inside of the flywheel 38, a power coil (power generation coil) 44 is installed on the crankcase 30, and a magnet (permanent magnet) 46 is installed on the back surface of the flywheel 38. The power coil 44 and the magnet 46 comprise a multipolar generator and produce an output synchronized with the rotation of the crankshaft 32.

On the outside of the flywheel 38, an exciter coil 48 is installed on the crankcase 30, and a magnet (permanent magnet) 50 is installed on the front surface of the flywheel 38. The exciter coil 48 produces output every passage of the magnet 50.

A camshaft 52 is accommodated in the crankcase 30 rotatably and parallel to the axis of the crankshaft 32, and connected to the crankshaft 32 through a gear mechanism 54 to be driven thereby. The camshaft 52 is equipped with an intake side cam 52a and an exhaust side cam 52b to drive the intake valve 24 and the exhaust valve 26 through pushrods (not shown) and rocker arms 56, 58. A carburetor 60 is connected to the intake port 20.

Figure 2:
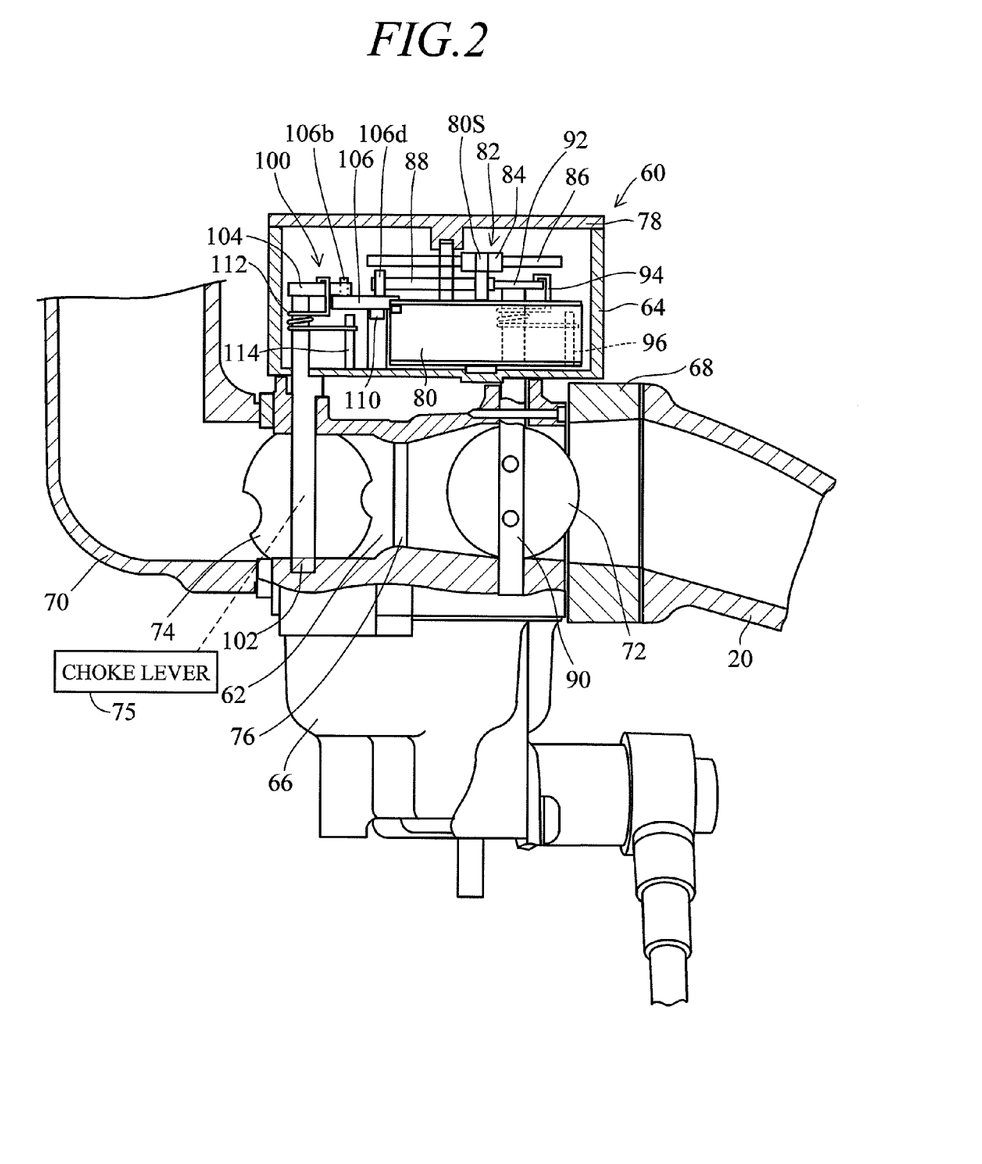
FIG. 2 is an enlarged sectional view of a carburetor of the general purpose engine shown in FIG. 1.

FIG. 2 is an enlarged sectional view of the carburetor 60.

As shown in FIG. 2, the carburetor 60 is integrally installed with an intake air passage 62, motor case 64 and carburetor assembly 66. A downstream side of the intake air passage 62 is connected to the intake port 20 through an insulator 68 and an upstream side is connected to an air cleaner (not shown) through an air cleaner elbow 70. A throttle valve 72 is disposed in the intake air passage 62, and a choke valve 74 is disposed upstream of the throttle valve 72. A venturi 76 reduced in diameter is formed between the throttle valve 72 and the choke valve 74 in the intake air passage 62.

A cover 78 is installed on the motor case 64, and an electric motor (actuator) 80 for driving the throttle valve 72 and the choke valve 74 is disposed in an internal space formed by the motor case 64 and the cover 78. The electric motor 80 comprises a stepper motor and equipped with a stator wound with a coil and a rotor. The electric motor 80 is connected to the throttle valve 72 through a throttle valve opening/closing mechanism 82.

Figure 3:
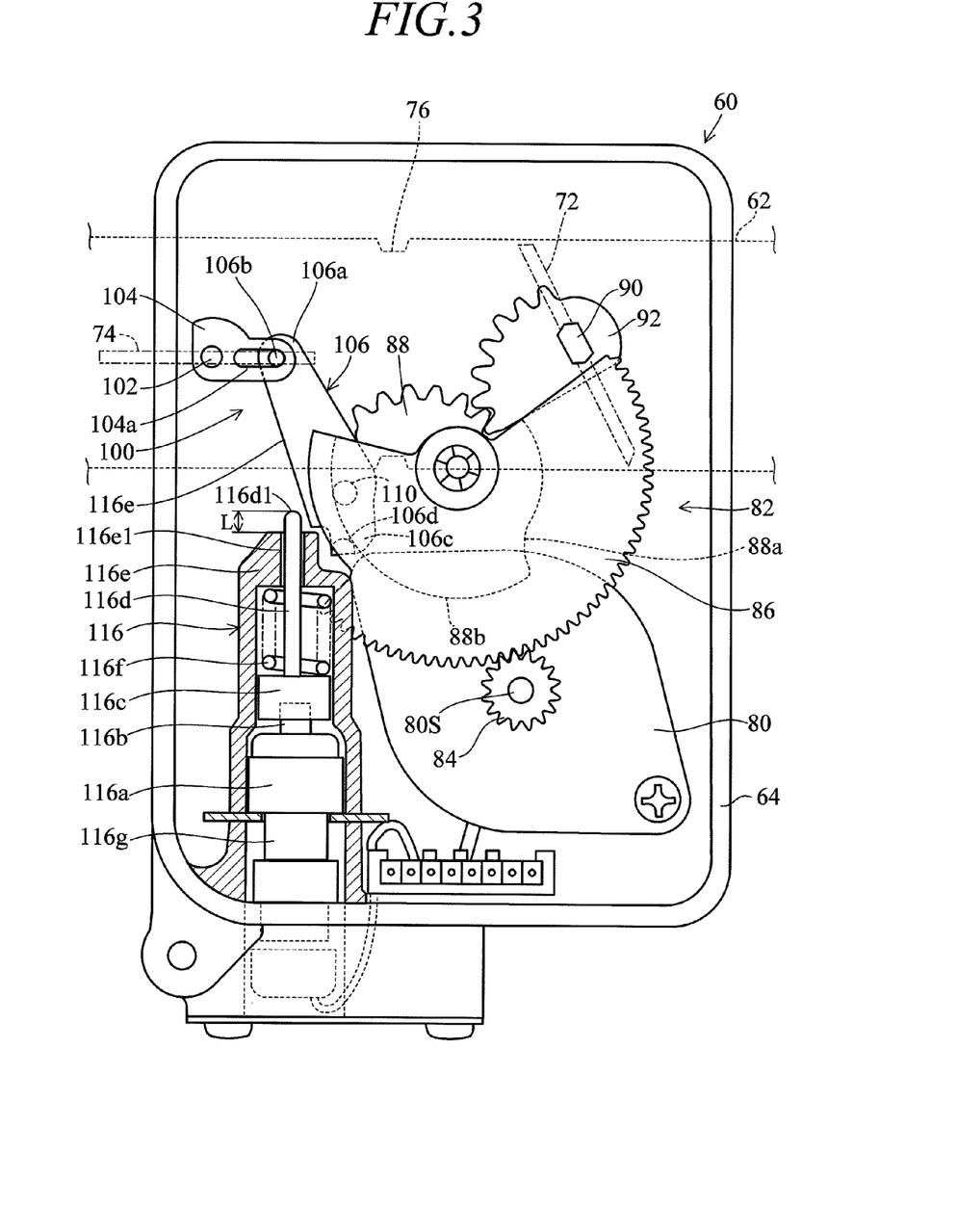
FIG. 3 is a sectional view partially showing the carburetor shown in FIG. 2 with a cover of a motor case removed.

FIG. 3 is a sectional view partially showing the carburetor 60 with the cover 78 removed. It should be noted that, as shown by two-dot dashed line, FIG. 3 shows a situation or state where the throttle valve 72 is in a fully closed position and the choke valve 74 is in a fully opened position.

As shown in FIGS. 2, 3, the throttle valve opening/closing mechanism 82 has four gears (all external gears). Specifically, a first gear 84 is installed on an output shaft 80S of the electric motor 80 and the first gear 84 is meshed with a second gear 86 rotatably supported inside the motor case 64. A third gear (eccentric gear) 88 is installed on the same axis as the second gear 86 to rotate integrally with the second gear 86. Teeth of the third gear 88 are formed only on a part of the circumference of the third gear 88.

The third gear 88 is meshed with a fourth gear (eccentric gear) 92 installed on a throttle shaft 90 for supporting the throttle valve 72. With this, the output power of the electric motor 80 is transmitted to the throttle shaft 90 while being reduced speed at the gears 84, 86, 88, 92 to open/close the throttle valve 72.

A throttle return spring 94 (shown in FIG. 2) is disposed on the circumference of the throttle shaft 90. The throttle return spring 94 comprises a torsion coil spring, and its one end is connected to the fourth gear 92 installed to the throttle shaft 90, while the other end is connected to a hook pin 96 (shown in FIG. 2) projecting to the inside of the motor case 64. The spiral direction of the throttle return spring 94 is set to a direction to open the throttle valve 72 by the throttle shaft 90.

The choke valve 74 is connected to the throttle valve opening/closing mechanism 82 configured as above through a choke valve opening/closing mechanism 100. Therefore, the electric motor 80 is connected to the throttle valve 72 through the throttle valve opening/closing mechanism 82 and also connected to the choke valve 74 through the throttle valve opening/closing mechanism 82 and the choke valve opening/closing mechanism 100.

The choke valve opening/closing mechanism 100 comprises an arm 104 installed to a choke shaft 102 for supporting the choke valve 74 to rotate the choke shaft 102, and a link 106 for connecting the arm 104 and the third gear 88 of the throttle valve opening/closing mechanism 82.

The link 106 is rotatably supported about a rotating shaft 110 inside the motor case 64. In the link 106, a first pin 106b is provided from an end part (one end) 106a at the side of the arm 104 to project upward as shown in FIG. 2. The first pin 106b is inserted into a slot 104a opened in the arm 104.

In the link 106, a second pin 106d projects upward from an end part (the other end) 106c at the third gear 88 side as shown in FIG. 2. The second pin 106d abuts on a part of the circumference of the third gear 88 at a part where the teeth are not formed. The part of the circumference of the third gear 88 without teeth is substantially in a disk-like shape, and has a concave portion. In the following, the concave portion formed at the circumference of the third gear 88 is referred to as a "first abutting part" and indicated by symbol 88a. And, the remaining portion of the part of the circumference of the third gear 88 without teeth, other than the first abutting part 88a, is referred to as a "second abutting part", and indicated by symbol 88b.

As shown in FIG. 2, a choke return spring 112 is disposed around the circumference of the choke shaft 102. Like the throttle return spring 94, the choke return spring 112 also comprises a torsion coil spring, and its one end is connected to the arm 104, while the other end is connected to a hook pin 114 that projects inside of the motor case 64. The spiral direction of the choke return spring 112 is set to a direction to open the choke valve 74 by the choke shaft 102.

In the choke valve opening/closing mechanism 100, since it is configured to have the choke return spring 112 to urge the choke valve 74 in closing direction (toward a fully closed position), the urging force thereof is transmitted to the link 106 through the arm 104. Therefore, force acts on the link 106 counterclockwise about the rotating shaft 110, so that the second pin 106d of the link 106 is urged to abut on the first or second abutting part 88a, 88b of the third gear 88.

In the motor case 64, a choke valve opening regulating mechanism 116 (shown in FIG. 3) for regulating opening of the choke valve 74 is further disposed. The choke valve opening regulating mechanism 116 comprises a thermo wax (regulating member). Specifically the mechanism 116 comprises a wax part 116a, a rod 116b connected to the wax part 116a to be displaceable linearly by expansion/contraction of the wax part 116a, a driving pin 116d connected to the wax part 116a through the rod 116b and a flange 116c to be displaceable linearly in association with the displacement of the rod 116b, a case 116e for accommodating them and a heater 116g for heating the wax part 116a. The wax part 116a is filled with wax that expands/contracts in response to the increase/decrease in the ambient temperature, specifically, its volume increases as the ambient temperature increases, while decreasing as the ambient temperature decreases. It should be noted that, FIG. 3 shows the choke valve opening regulating mechanism 116 in a situation or state where the wax contracts.

Although not shown, the heater 116g is an electric heater made of a heating wire such as a nichrome wire, an insulating material for covering the heating wire, a protecting tube and the like to be energized upon being supplied with operating current from the power coil 44 to heat.

A tip end 116d1 of the driving pin 116d is formed to project outward from a hole 116e1 opened in the case 116e to be abuttable on a side surface 106e of the link 106 of the choke valve opening/closing mechanism 100. The driving pin 116d is urged by a return spring 116f in the direction to contract, i.e., direction to shorten a projecting amount (projecting length) L of the tip end 116d1 (lower direction in the sheet). Therefore, the projecting amount L of the driving pin 116d becomes minimum, when the wax contracts by the urging force of the return spring 116f as shown in FIG. 3.

Returning to the explanation of FIG. 2, although not shown, the carburetor assembly 66 has a float chamber connected to a fuel tank, a main nozzle connected to the float chamber through a main jet and a main fuel passage, and an idle port and a slow port connected to a slow fuel passage branched from the main fuel passage. The main nozzle is disposed at a position facing the venturi 76, and the idle port and the slow port are disposed at positions facing near the throttle valve 72.

As schematically illustrated in the figure, a choke lever (manual opening/closing mechanism) 75 is provided at a location adjacent to the choke valve 74 to be manipulated and operated by the user.

When an opening of the throttle valve 72 is large, the fuel is injected from the main nozzle by the negative pressure due to intake air passing through the venturi 76 to produce air-fuel mixture. While when the opening of the throttle valve 72 is small, the fuel is injected from the idle port or the slow port by the negative pressure due to intake air passing through the throttle valve 72. And, when the choke valve 74 is closed, since the negative pressure in the intake air passage 62 produced by downward movement of the piston 14 increases, fuel injection amount is increased to make air/fuel ratio rich. In the following, the situation or state where air/fuel ratio in the intake air passage 62 is made rich is referred to as "rich ratio state".

Returning to the explanation of FIG. 1, the air-fuel mixture produced as above passes through the intake port 20 and the intake valve 24 to be sucked into the combustion chamber 18, ignited by an ignition plug (not shown) to be ignited, and the resulting combustion gas is exhausted to the outside of the engine 10 through the exhaust valve 26, the exhaust port 22, a silencer (not shown) and the like.

A temperature sensor (temperature detector) 120 comprising thermister and the like is disposed at an appropriate position of the cylinder block 12 to produce an output indicative of temperature of the engine 10. The outputs of the temperature sensor 120, the power coil 44 and the exciter coil 48 are sent to the ECU 124. The ECU 124 is constituted by a microcomputer having a CPU, ROM, RAM, input/output circuit and the like. It should be noted that, a warning lamp 126 made of an LED and the like is connected to the ECU 124.

Next, opening/closing operation of the throttle valve 72 and the choke valve 74, mainly the operation of the electric motor 80, the throttle valve opening/closing mechanism 82, the choke valve opening/closing mechanism 100 and the choke valve opening regulating mechanism 116 will be explained with reference to FIGS. 3 to 6.

Figure 4:
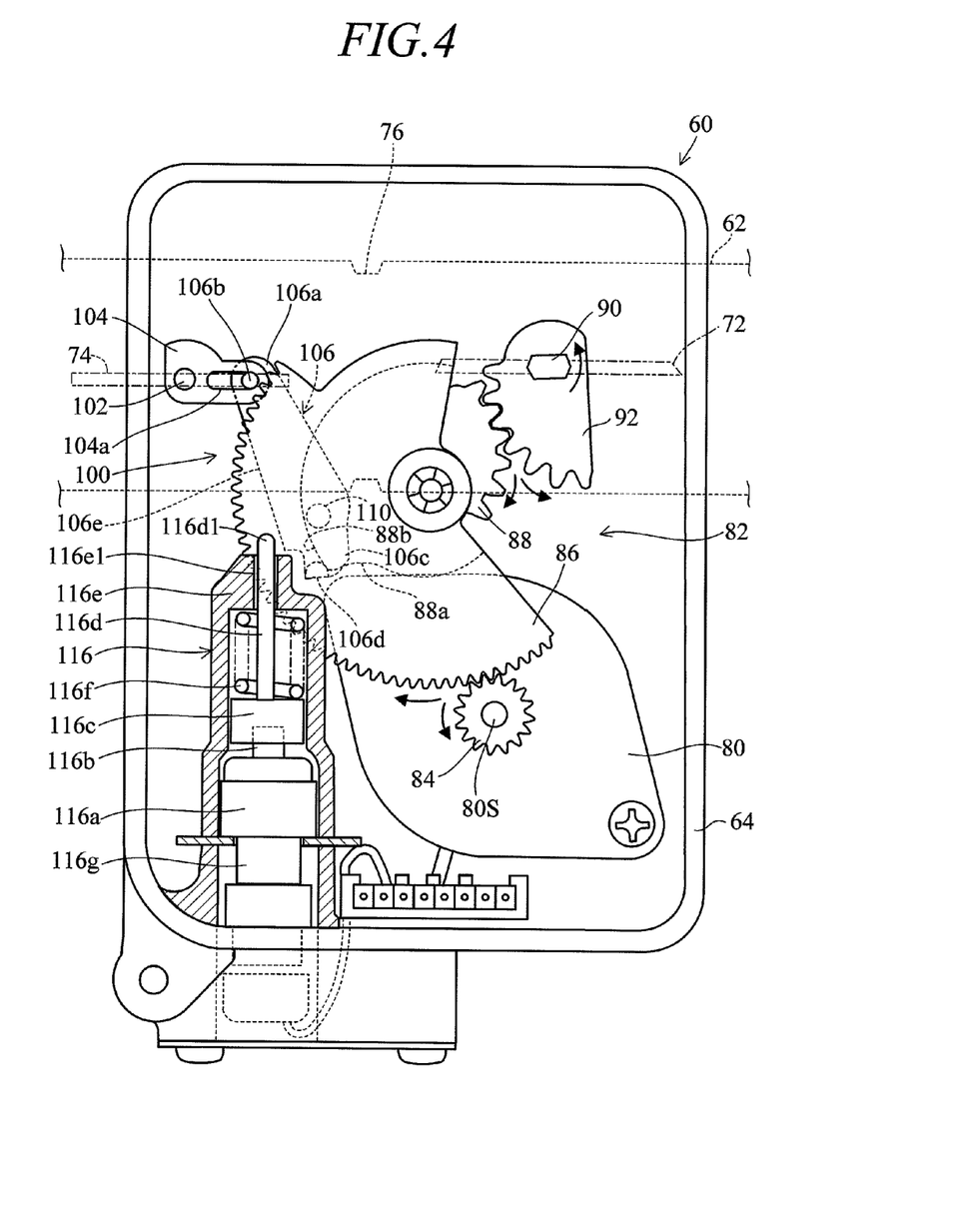
FIG. 4 is the same sectional view as FIG. 3 partially showing a situation or state where a throttle valve and a choke valve shown in FIG. 2 are in a fully opened position.
Figure 5:
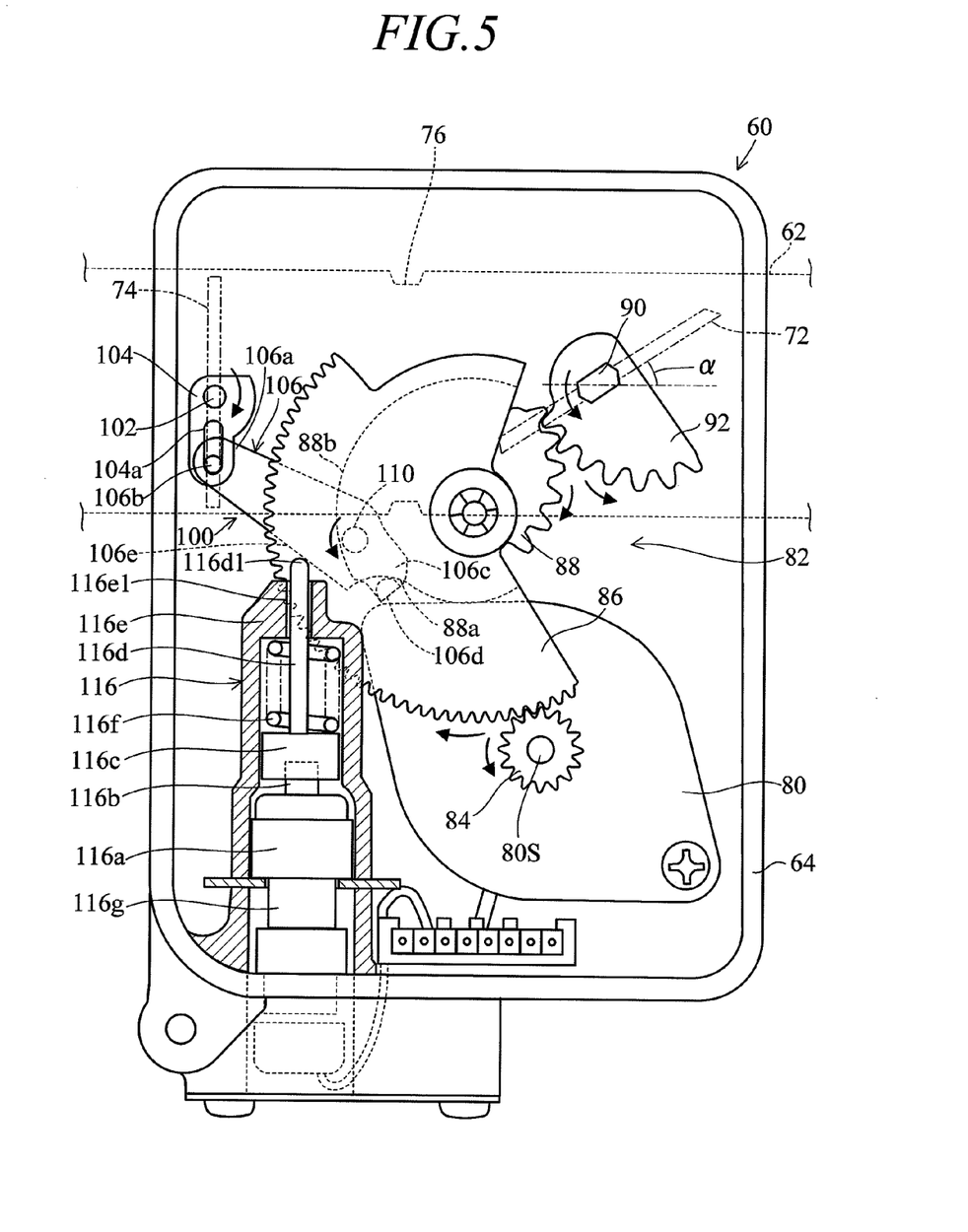
FIG. 5 is the same sectional view as FIG. 3 partially showing a situation or state where the throttle valve shown in FIG. 2 exceeds the fully opened position by a predetermined opening and the choke valve shown in FIG. 2 is in a fully closed position.
Figure 6:
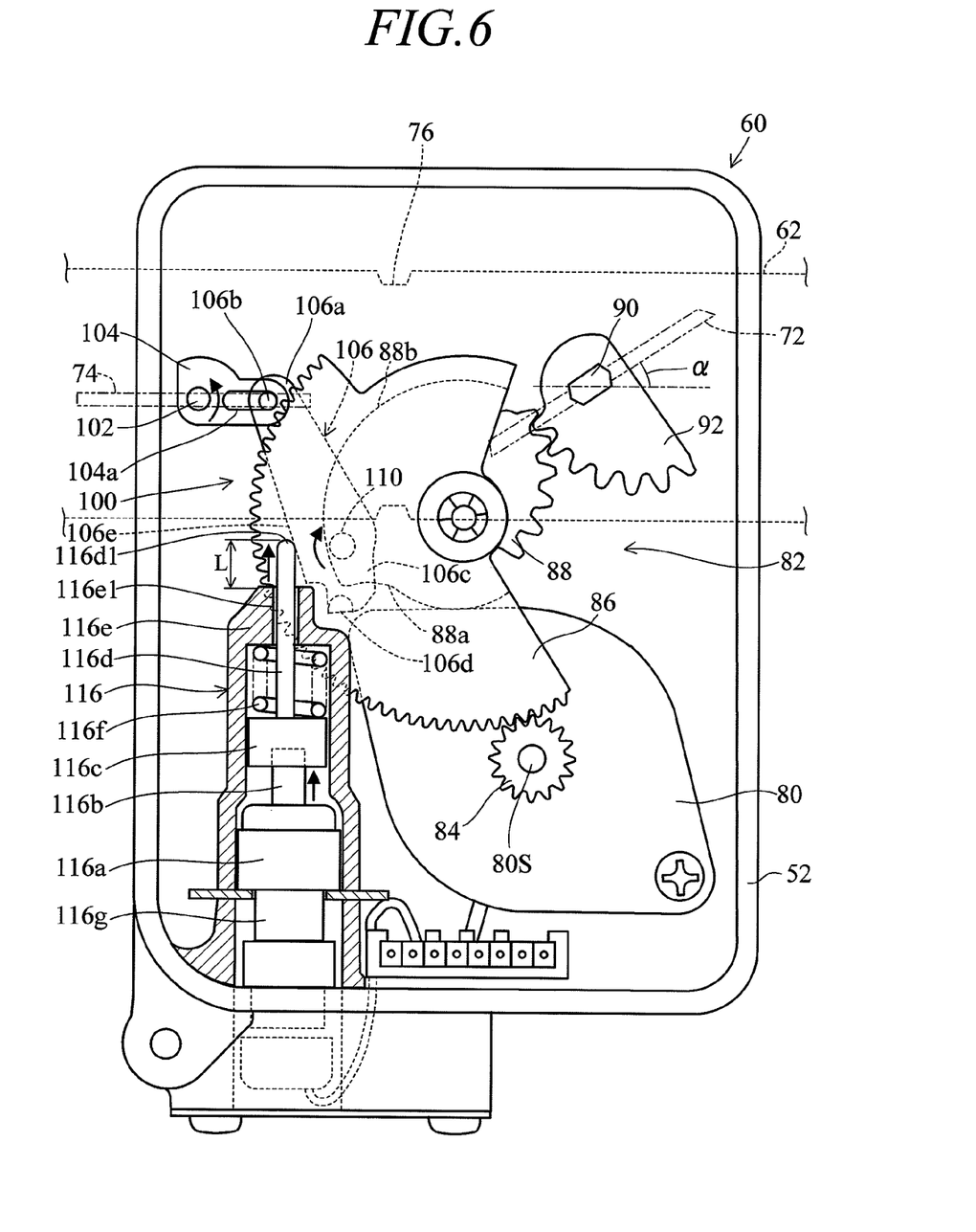
FIG. 6 is the same sectional view as FIG. 3 partially showing a situation or state where the throttle valve shown in FIG. 2 exceeds the fully opened position by a predetermined opening and the choke valve shown in FIG. 2 is in the fully opened position.

FIGS. 4 to 6 are the similar sectional views as FIG. 3 partially showing the carburetor 60 with the cover 78 removed.

FIG. 4 shows a situation or state where the throttle valve 72 and the choke valve 74 are in a fully opened position, FIG. 5 shows a situation or state where the opening of the throttle valve 72 exceeds the fully opened position by a predetermined opening a (hereinafter referred to as "overshooting fully opened position") while the choke valve 74 is in a fully closed position, and FIG. 6 shows a situation or state where the throttle valve 72 is in the overshooting fully opened position and the choke valve 74 is in the fully opened position.

As shown in FIG. 3, in order to bring the throttle valve 72 to the fully closed position, the electric motor 80 rotates the throttle shaft 90 through the first to fourth gears 84, 86, 88, 92 of the throttle valve opening/closing mechanism 82 so as to close the throttle valve 72 to the fully closed position. At that time, the second pin 106d of the link 106 abuts on the second abutting part 88b of the third gear 88, and the choke valve 74 is in the fully opened position.

As shown in FIG. 4, in order to bring the throttle valve 72 to the fully opened position from the fully closed position, the electric motor 80 rotates the first to fourth gears 84, 86, 88, 92 in a direction shown by arrow in FIG. 4 to rotate the throttle shaft 90 counterclockwise so as to open the throttle valve 72 to the fully opened position. At that time, although the second pin 106d slides to a position near the first abutting part 88a, since it still remains to abut on the second abutting part 88b, the choke valve 74 is kept in the fully opened position. As mentioned above, the choke valve opening/closing mechanism 100 keeps the choke valve 74 in the fully opened position when the throttle valve 72 is at a position between the fully closed position and the fully opened position.

And, in order to close the choke valve 74 to make air/fuel ratio rich at starting of the engine 10 and the like, the electric motor 80 rotates each gear 84, 86, 88, 92 in a direction shown by arrow in FIG. 5 to further rotate the throttle shaft 90 counterclockwise to open the throttle valve 72 to the overshooting fully opened position.

At that time, the second pin 106d slides to a position adjacent to the first abutting part 88a by the rotation of the third gear 88. With this, the link 106 is rotated counterclockwise about the rotating shaft 110 and the first pin 106b slides in the slot 104a to displace the arm 104. The choke shaft 102 is rotated clockwise in the figure by the displacement of the arm 104 so as to close the choke valve 74 to the fully closed position.

Thus, in the third gear 88, the first, second abutting parts 88a, 88b are formed at positions where the choke valve 74 is in the fully opened position and the third gear 88 is rotated clockwise by the electric motor 80 when the second pin 106d abuts on the second abutting part 88b (situation or state shown in FIGS. 3, 4), and the choke valve 74 is in the fully closed position when the second pin 106d abuts on the first abutting part 88a (situation or state shown in FIG. 5).

Further, the choke valve opening/closing mechanism 100 is configured to open/close the choke valve 74 to keep the choke valve 74 in the fully opened position when the throttle valve 72 is at a position between the fully closed position and the fully opened position, while to open/close the choke valve 74 between the fully opened position and the fully closed position when the throttle valve 72 is at a position between the fully opened position and the overshooting fully opened position, in association with operation of the throttle valve opening/closing mechanism 82.

Here, the operation of the choke valve opening regulating mechanism 116 will be explained with reference to FIG. 3 and FIGS. 5, 6. FIG. 5 shows, as FIG. 3, the choke valve opening regulating mechanism 116 in a situation or state where the wax of the wax part 116a contracts, and FIG. 6 shows the choke valve opening regulating mechanism 116 in a situation or state where the wax of the wax part 116a expands.

In the choke valve opening regulating mechanism 116, when the ambient temperature is relatively low and is below the operating temperature of the choke valve opening regulating mechanism 116 (thermo wax), since the wax of the wax part 116a contracts, the projecting amount L of the driving pin 116d becomes minimum. At that time, the driving pin 116d does not abut on the side surface 106e of the link 106, or does slightly contact therewith as shown in FIG. 3 or FIG. 5.

When the ambient temperature increases due to exhaust heat of the engine 10 or heat generation of the heater 116g and becomes equal to or greater than an operating temperature, the wax part 116a expands and pushes the rod 116b and the flange 116c upward in the sheet as shown in FIG. 6. With this, the driving pin 116d displaces upward in the sheet against urging force of the return spring 116f so as to increase the projecting amount L. It should be noted that, the wax operating temperature is set to, for example, about 70° C.

Consequently, when the choke valve 74 is in the fully closed position (FIG. 5), the displacement of the driving pin 116d due to the expansion of the wax part 116a makes the driving pin 116d push the side surface 106e of the link 106 to rotate the link 106 clockwise about the rotating shaft 110 as shown in FIG. 6. With this, the second pin 106d is moved away from the outer peripheral surface of the third gear 88, and the first pin 106b is moved to slide in the slot 104a so as to displace the arm 104. By the displacement of the arm 104, the choke shaft 102 is rotated counterclockwise in the figure to open the choke valve 74 to the fully opened position. In this way, the driving pin 116d drives the link 106, the arm 104 and the like of the choke valve opening/closing mechanism 100 in response to the expansion/contraction of the wax part 116a and regulates opening of the choke valve 74.

Figure 7:
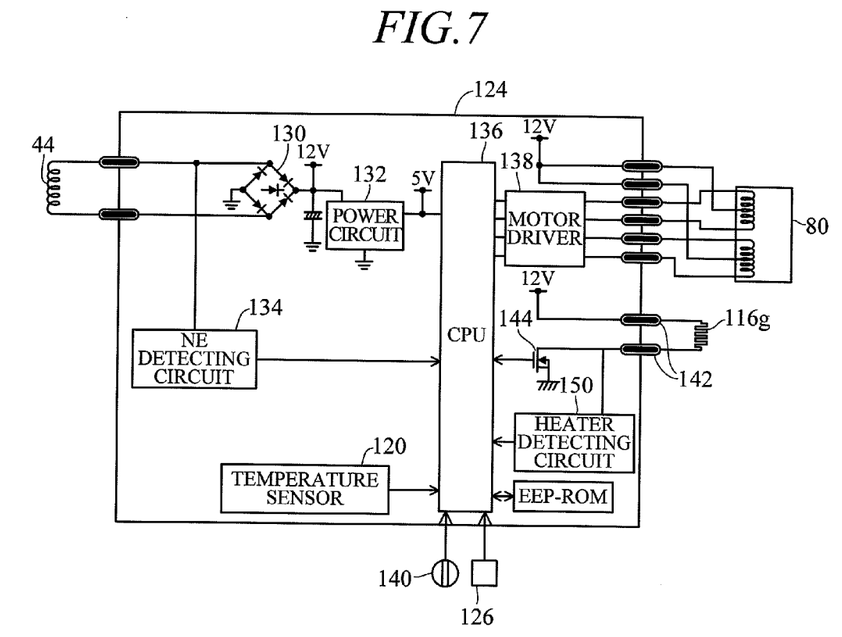
FIG. 7 is an explanatory diagram showing configuration of the electronic control unit shown in FIG. 1.

Next, the configuration of the ECU 124 will be explained.

Figure 8:
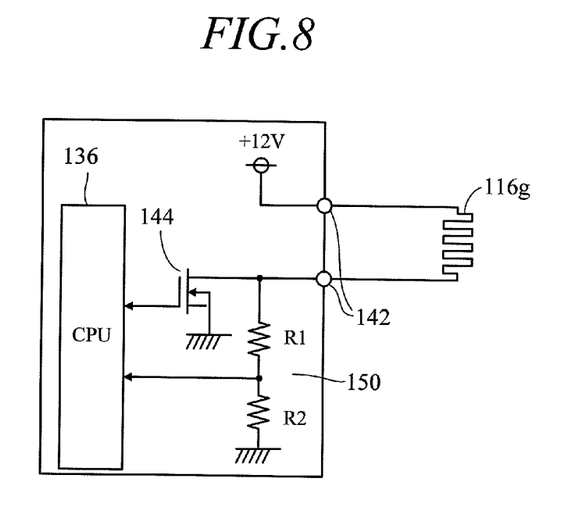
FIG. 8 is an explanatory diagram showing configuration of a heater detecting circuit shown in FIG. 7.

FIG. 7 is an explanatory diagram showing the configuration of the ECU 124, and FIG. 8 is an explanatory diagram showing the configuration of a heater detecting circuit of the ECU 124.

As shown in FIG. 7, the ECU 124 has a rectifying (bridge) circuit 130 that rectifies output power (AC power) of the power coil 44 to DC power (12V), a power circuit 132 that transforms 12V power generated by the rectifying circuit 130 to 5V power, an NE detecting circuit 134 that generates pulse signals for detecting an engine speed NE based on the output of the power coil 44, a CPU 136 that controls the operation of the ECU 124, a motor driver 138 that controls the operation of the electric motor 80, and the like.

The output (AC power) of the power coil 44 is full-wave rectified by the rectifying circuit 130 to be rectified to 12V DC power that is used as an operation power source of the electric motor 80, the heater 116g and the like. And, the 12V power generated by the rectifying circuit 130 is transformed to 5V DC power by the power circuit 132 to be used as an operation power source of the CPU 136 and the like.

The output of the power coil 44 is also inputted to the NE detecting circuit 134 and, after being half-wave rectified, converted to pulse signals that use an appropriate value as a threshold level. The pulse signals generated by the NE detecting circuit 134 are inputted to the CPU 136. Since the frequency of the AC current generated by the power coil 44 is proportional to the rotation number of the crankshaft 32, the CPU 136 detects the engine speed NE based on the intervals of the inputted pulse signals.

And, an engine speed setting volume 140 is connected to the CPU 136. The CPU 136 determines desired openings of the throttle valve 72 and choke valve 74 based on the output of the engine speed setting volume 140, NE detecting circuit 134 and the like. The CPU 136 outputs command signals determined based on the determined desired openings to the motor driver 138 and operates the electric motor 80 to open/close the throttle valve 72 and the choke valve 74 to conduct an electronic governor control for regulating the engine speed NE.

The ECU 124 has a heater connection terminal 142 to which the heater 116g is connected, and the heater 116g is supplied with 12V power. The CPU 136 is connected to the negative side of the heater connection terminal 142 through a heater driving circuit (switching element; MOSFET is exemplified in the FIG. 144. Accordingly, by controlling voltage to the heater driving circuit 144 (specifically, the gate of the transistor) by the CPU 136, it becomes possible to control current supply to the heater 116g.

A heater detecting circuit 150 is connected to the negative side of the heater connection terminal 142. As shown in FIG. 8, the heater detecting circuit 150 is a voltage dividing circuit, in which the voltage divided by resistors R1 and R2 is inputted to (an A/D port of) the CPU 136. The CPU 136 determines whether the heater 116g is connected to the heater connection terminal 142 from the inputted voltage. For example, when the inputted voltage is equal to or greater than a predetermined value (for example 2V), it is determined that the heater 116g is connected to the heater connection terminal 142. Here, when the heater driving circuit 144 is made ON (the source and drain are conducted), since the voltage is always GND level, it is impossible to detect whether or not the heater 116g is connected. The output of the temperature sensor 120 for detecting temperature of the engine 10 is also inputted to the CPU 136.

The configuration of the control apparatus for the engine 10 according to the embodiment of this invention is as above. Next, operation of the ECU 124 will be explained.

Figure 9:
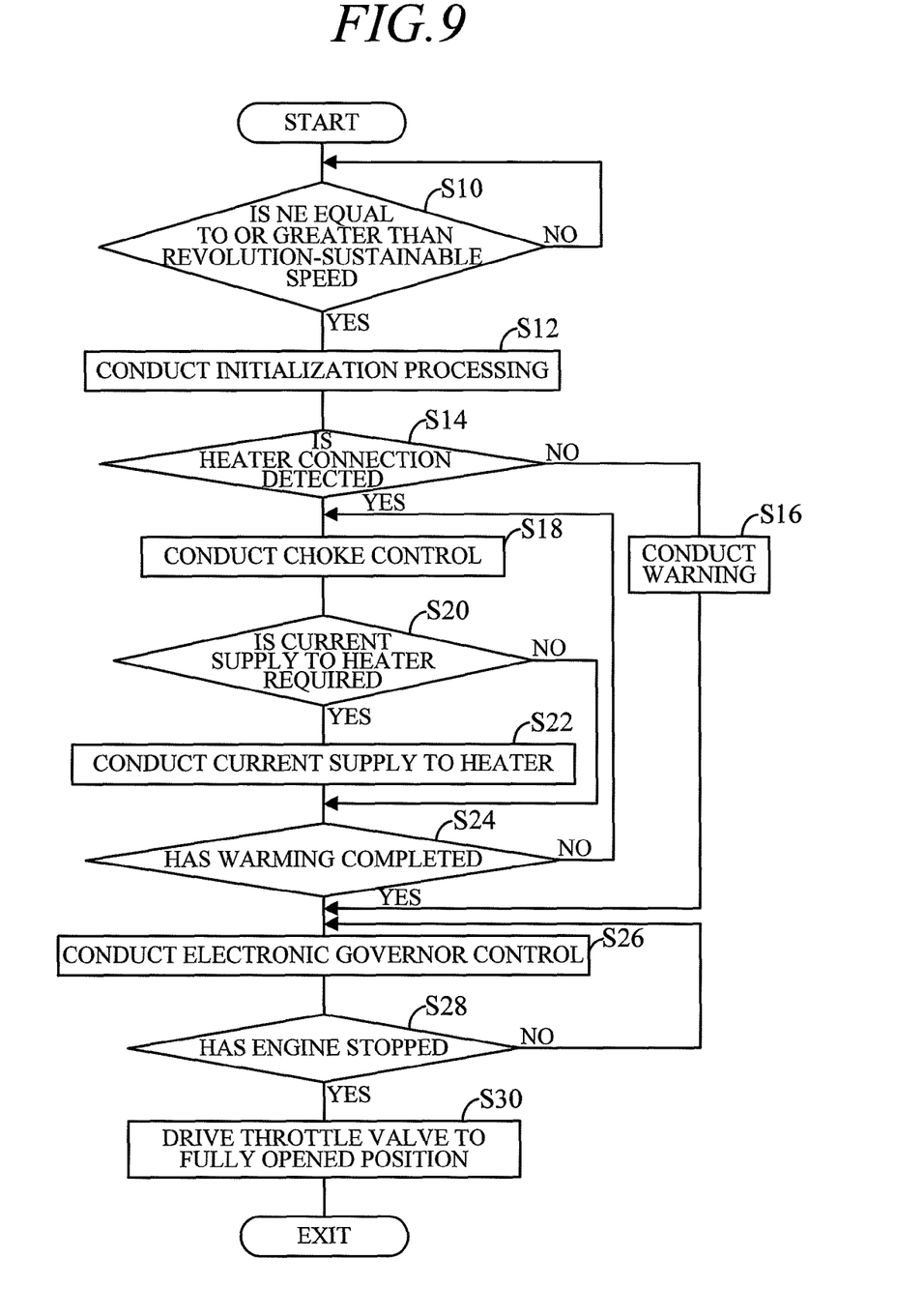
FIG. 9 is a flowchart showing operation of the electronic control unit shown in FIG. 1.

FIG. 9 is a flowchart showing operation of the ECU 124. The program is executed when the recoil starter 42 is manipulated and the ECU 124 is then activated in response to current supply by the power coil 44.

To explain in the following, the program begins at S10 (S: Step), in which it is determined whether the detected engine speed NE is equal to or greater than a revolution-sustainable speed. The revolution-sustainable speed is an engine speed that enables to determine that the starting of the engine 10 by the recoil starter 42 is completed, and set to, for example 800 rpm.

When the result in S10 is negative, the processing is waited until it is determined that the engine speed NE is equal to or greater than the revolution-sustainable speed. On the other hand, when the result in S10 is affirmative, the program proceeds to S12, in which an initialization processing is conducted. The initialization processing indicates a processing for moving the throttle valve 72 to the fully opened/closed position (at that time, the choke valve 74 is in the fully closed position), such that it becomes possible to detect a current throttle opening using that position as a reference.

The program next proceeds to S14, in which it is determined whether the heater 116g is connected to the heater connection terminal 142 based on the output value from the heater detecting circuit 150. As stated above, whether the heater 116g is connected to the heater connection terminal 142 is determined based on the voltage outputted from the heater detecting circuit 150. Specifically, when the voltage outputted from the heater detecting circuit 150 is equal to or greater than the predetermined value, it is determined that the heater 116g is connected to the heater connection terminal 142, but when the voltage is smaller than the predetermined value, it is determined that the heater 116g is not connected to the heater connection terminal 142.

When the result in S14 is negative, the program proceeds to S16, in which a warning that the heater 116g is not connected is made, specifically it is warned or alerted to the user that the heater 116g is not connected, for example, by lighting the warning lamp 126, displaying a message on a displaying device (not shown), outputting an alarm from a speaker (not shown), or the like. It should be noted that, if the heater 116g has not been connected to the heater connection terminal 142, it can be said that the above mentioned warning substantially means that the user is urged or suggested to manually open/close the choke valve 74 (manual choking function). In response to this warning, the user will be able to manipulate the choke lever 75 or the like to regulate opening of the choke valve 74.

When the result in S14 is affirmative, i.e., when it is determined that the heater 116g is connected to the heater connection terminal 142, the program proceeds to S18, in which a choking function (an automatic choking function) is conducted. The choking function means a control for making air/fuel ratio in the intake air passage 62 rich to improve startability of the engine 10 by controlling the opening of the choke valve 74 based on the output value of the temperature sensor 120 and the like at the engine starting.

The program next proceeds to S20, in which it is determined whether the current supply to the heater 116g is required. By the time when the warming (operation) is completed by conducting the choking function, the wax part 116a of the choke valve opening regulating mechanism 116 would expand normally by heat received from the engine 10 to extend the driving pin 116d to forcibly open the choke valve 74. However, even when the warming has been completed, depending on the temperature condition, or using condition of the engine 10, etc., the expansion of the wax part 116a may become insufficient, thereby making air/fuel ratio rich excessively and it results in black smoke. Therefore, when the expansion of the wax part 116a is insufficient even though it is determined that the warming is completed from the output value of the temperature sensor 120, etc., since it is required to heat the wax part 116a to expand, it is determined that the current supply to the heater 116g is required.

When the result in S20 is affirmative, the program proceeds to S22, in which the current supply to the heater 116g is conducted. On the contrary, when the result in S20 is negative, the program skips S22 to proceed to S24.

The program next proceeds to S24, in which it is determined whether the warming has been completed. When the result in S24 is negative, the program returns to S18. While, when the result in S24 is affirmative, the program proceeds to S26, in which the electronic governor control is conducted. The electronic governor control is to control the throttle opening to keep the engine speed NE to the desired engine speed.

The program next proceeds S28, in which it is determined whether the engine 10 has stopped, i.e., whether it is detected that an engine switch (not shown) is made OFF. When the result in S28 is negative, the program returns to S26 to continue the electronic governor control. On the other hand, when the result in S28 is affirmative, the program proceeds to S30, in which the operation of the electric motor 80 is controlled to drive (open) the throttle valve 72 to the fully opened position to terminate the processing.

As mentioned above, after engine starting, the ECU 124 (CPU 136) determines whether the heater 116g is connected to the heater connection terminal 142 (S14). When it is determined that the heater 116g is connected (YES in S14), it conducts the choking function to conduct warming (S18 to S24). On the other hand, when it is determined that the heater 116g is not connected (NO in S14), it does not conduct the choking function but conducts warning indicating that the heater 116g is not connected and switches to the electronic governor control (S16, S26). Specifically, the ECU 124 determines that the engine 10 having the choke valve opening/closing mechanism 100, the choke valve opening regulating mechanism 116 and the like is connected to conduct the choking function when it is determined that the heater 116g is connected, while determining that the engine 10 does not have the choke valve opening/closing mechanism 100 and the choke valve opening regulating mechanism 116 but has the manual opening/closing mechanism 75. Accordingly, it instead informs the user to manually move the choke valve 74 by the manual opening/closing mechanism 75.

By the way, although the heater 116g is connected to the heater connection terminal 142, due to wire breaking of the heater 116g, it can be determined that the heater 116g is not connected. However, if the choking function is conducted with the wire of the heater 116g broken, the ratio becomes rich during the choking function, and black smoke can be exhausted. Therefore, it is configured not to conduct the choking function by determining that the heater 116g is not connected even when the wire of the heater 116g is broken to prevent exhaust of black smoke. If it is configured not to conduct the choking function when the wire of the heater 116g is broken, the engine 10 may stop, for example, in a case where the load 36 is suddenly connected. However, since the stop of the engine 10 suggests occurrence of some malfunctions (wire break of the heater 116g), it is preferable to the user.

As stated above, the embodiment of this invention is configured to have an apparatus or method for controlling a general purpose engine (engine) 10 having a choke valve 74 disposed at an intake air passage 62, a choke valve opening/closing mechanism 100 that opens/closes the choke valve 74, a choke valve opening regulating mechanism 116 having regulating member (thermo wax) that regulates opening of the choke valve 74 opened/closed by the choke valve opening/closing mechanism 100 and a heater 116g that can heat the regulating member, and a heater connection terminal 142 that connects the heater 116g to a power circuit 132, comprising: a temperature detector (temperature sensor) 120 that detects temperature of the general purpose engine 10; a heater connection determiner (CPU 136, heater detecting circuit 150, S14) that determines whether the heater 116g is connected to the heater connection terminal 142; and a choke controller (CPU 136, S20, S22) that controls operation of the choke valve opening/closing mechanism 100 based on the detected temperature to open/close the choke valve 74 when it is determined that the heater 116g is connected to the heater connection terminal 142, while informing a user to manually open/close the choke valve 74 by a manual opening/closing mechanism 75 when it is determined that the heater 116g is not connected to the heater connection terminal 142. With this, it becomes possible to determine whether the engine has the automatic choking function or the manual choking function by determining whether the heater 116g is connected to the heater connection terminal 142. And it also becomes possible to use a single type of ECU 124 regardless of whether the engine 10 has the automatic choking function or the manual choking function by having a single controller (choke controller) that can switch controls according to the type of the engine. Specifically, since it is not required to have many different ECUs according to the types of the engines, problems that more manufacturing facilities are required and product management becomes complicated will not happen, and it becomes possible to prevent the possibility of wrong assembly in the after market.

In the apparatus and method, the heater connection determiner (CPU 136, heater detecting circuit 150, S14) determines whether the heater 116g is connected to the heater connection terminal 142 by detecting a voltage applied to the heater connection terminal 142. With this, it becomes possible to accurately determine whether the heater 116g is connected to the heater connection terminal 142.

In the apparatus and method, the heater connection determiner (CPU 136, heater detecting circuit 150, S 14) determines that the heater 116g is connected to the heater connection terminal 142 when the detected voltage of the heater connection terminal 142 is equal to or greater than a predetermined value. With this, it becomes possible to further accurately determine whether the heater 116g is connected to the heater connection terminal 142.

In the apparatus and method, the choke controller (CPU 136, S20, S22) controls current supply to the heater 116g based on the detected temperature when it is determined that the heater 116g is connected to the heater connection terminal 142. With this, it becomes possible to complete warming smoothly by controlling the current supply to the heater 116g based on the detected temperature.

In the apparatus and method, the engine 10 is an engine that is usable in a cold land. With this, it becomes possible for the general purpose engine having the automatic choking function to cope with a single type of ECU regardless of whether the general purpose engine has the manual choking function, especially in the cold land.

It should be noted that, in the embodiment, although the heater detecting circuit 150 comprises a voltage dividing circuit, it should not be limited thereto and any method that can determine whether the heater 116g is connected to the heater connection terminal 142 can instead be used.

It should further be noted that, in the embodiment, although it is configured to conduct warning that the heater 116g is not connected to urge the user to manually open/close the choke valve 74 when it is determined that the heater 116g is not connected to the heater connection terminal 142, it can instead be configured not to conduct this warning but to conduct processing just not conducting the choking function program when it is determined that the heater 116g is not connected to the heater connection terminal 142. Specifically, although it is configured to conduct the choking function program when it is determined that the heater 116g is connected to the heater connection terminal 142, and, after that, to conduct the electronic governor control program, it can instead be configured not to conduct the choking function program but to conduct the electronic governor control program when it is determined that the heater 116g is not connected to the heater connection terminal 142.

It should further be noted that, in the embodiment, although the operating temperature of the choke valve opening regulating mechanism 116, the predetermined voltage for determining whether the heater 116g is connected to the heater connection terminal 142 and the like are indicated by specific values, they are only examples and should not be limited thereto.

It should be noted that, the manual opening/closing mechanism 75 should not be limited to the choke lever, but it may be in any kind of tool or part.

Japanese Patent Application No. 2013-262270, filed on Dec. 19, 2013, is incorporated by reference herein in its entirety.

While the invention has thus been shown and described with reference to a specific embodiment, it should be noted that the invention is in no way limited to the details of the described arrangements; changes and modifications may be made without departing from the scope of the appended claims.

What is claimed is:

1. An apparatus for controlling a general purpose engine having a choke valve disposed at an intake air passage, a choke valve opening/closing mechanism that opens/closes the choke valve, a choke valve opening regulating mechanism having regulating member that regulates opening of the choke valve opened/closed by the choke valve opening/closing mechanism and a heater that can heat the regulating member, and a heater connection terminal that connects the heater to a power circuit, comprising:
   a temperature detector that detects temperature of the general purpose engine;
   a heater connection determiner that determines whether the heater is connected to the heater connection terminal; and
   a choke controller that controls operation of the choke valve opening/closing mechanism based on the detected temperature to open/close the choke valve when it is determined that the heater is connected to the heater connection terminal, while informing a user to manually open/close the choke valve by a manual opening/closing mechanism when it is determined that the heater is not connected to the heater connection terminal.

2. The apparatus according to claim 1, wherein the heater connection determiner determines whether the heater is connected to the heater connection terminal by detecting a voltage applied to the heater connection terminal.

3. The apparatus according to claim 2, wherein the heater connection determiner determines that the heater is connected to the heater connection terminal when the detected voltage of the heater connection terminal is equal to or greater than a predetermined value.

4. The apparatus according to claim 1, wherein the choke controller controls current supply to the heater based on the detected temperature when it is determined that the heater is connected to the heater connection terminal.

5. The apparatus according to claim 1, wherein the engine is an engine that is usable in a cold land.

6. A method for controlling a general purpose engine having a choke valve disposed at an intake air passage, a choke valve opening/closing mechanism that opens/closes the choke valve, a choke valve opening regulating mechanism having regulating member that regulates opening of the choke valve opened/closed by the choke valve opening/closing mechanism and a heater that can heat the regulating member, and a heater connection terminal that connects the heater to a power circuit, comprising the steps of:
 detecting temperature of the general purpose engine;
 determining whether the heater is connected to the heater connection terminal; and
 controlling operation of the choke valve opening/closing mechanism based on the detected temperature to open/close the choke valve when it is determined that the heater is connected to the heater connection terminal, while informing a user to manually open/close the choke valve by a manual opening/closing mechanism when it is determined that the heater is not connected to the heater connection terminal.

7. The method according to claim 6, wherein the step of heater connection determining determines whether the heater is connected to the heater connection terminal by detecting a voltage applied to the heater connection terminal.

8. The method according to claim 7, wherein the step of heater connection determining determines that the heater is connected to the heater connection terminal when the detected voltage of the heater connection terminal is equal to or greater than a predetermined value.

9. The method according to claim 6, wherein the step of choking functioning controls current supply to the heater based on the detected temperature when it is determined that the heater is connected to the heater connection terminal.

10. The method according to claim 6, wherein the engine is an engine that is usable in a cold land.

* * * * *